(12) United States Patent
Wang et al.

(10) Patent No.: US 11,813,942 B2
(45) Date of Patent: Nov. 14, 2023

(54) MOTOR CONTROL SYSTEM AND VEHICLE

(71) Applicant: Huawei Digital Power Technologies Co., Ltd., Shenzhen (CN)

(72) Inventors: Shuaijie Wang, Dongguan (CN); Yuan Zhou, Shenzhen (CN); Bucheng Ji, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/574,475

(22) Filed: Jan. 12, 2022

(65) Prior Publication Data
US 2022/0219547 A1   Jul. 14, 2022

(30) Foreign Application Priority Data

Jan. 14, 2021   (CN) .......................... 202110051283.2

(51) Int. Cl.
*H02P 6/14*      (2016.01)
*B60L 15/08*     (2006.01)
(Continued)

(52) U.S. Cl.
CPC ............. *B60L 15/08* (2013.01); *B60L 3/0092* (2013.01); *B60L 50/40* (2019.02); *B60L 50/66* (2019.02);
(Continued)

(58) Field of Classification Search
CPC .......... B60L 15/08; B60L 50/66; B60L 50/40; B60L 3/0092; B60L 2210/12; H02M 1/008; H02M 3/152; H02P 27/08
See application file for complete search history.

(56) References Cited

U.S. PATENT DOCUMENTS

| | | |
|---|---|---|
| 8,994,208 B2 | 3/2015 | Huang |
| 2021/0006195 A1 | 1/2021 | Maeda et al. |

FOREIGN PATENT DOCUMENTS

| | | |
|---|---|---|
| CN | 207251512 U | 4/2018 |
| CN | 108134522 A | 6/2018 |

(Continued)

OTHER PUBLICATIONS

CN/202110051283.2, Office Action and Search Report, dated Apr. 6, 2023.

(Continued)

*Primary Examiner* — Karen Masih
(74) *Attorney, Agent, or Firm* — Leydig, Voit & Mayer, Ltd.

(57) ABSTRACT

A motor control system and a vehicle reliably perform a three-phase active short circuit on a motor when a single-point power source fails. The motor control system includes a bus capacitor and a motor. The motor is connected to a positive direct current bus and a negative direct current bus through three phases of inverter bridges, the positive direct current bus and the negative direct current bus are respectively connected to a positive terminal and a negative terminal of the bus capacitor, and each phase of inverter bridge includes an upper bridge arm connected to the positive direct current bus and a lower bridge arm connected to the negative direct current bus. In addition, the motor control system further includes: an upper gate drive circuit, a lower gate drive circuit, a first power supply unit, and a second power supply unit.

18 Claims, 6 Drawing Sheets

(51) Int. Cl.
    *B60L 50/60*     (2019.01)
    *B60L 50/40*     (2019.01)
    *H02M 1/00*     (2006.01)
    *B60L 3/00*     (2019.01)
    *H02M 3/158*     (2006.01)
    *H02P 27/08*     (2006.01)

(52) U.S. Cl.
    CPC ......... *H02M 1/008* (2021.05); *H02M 3/1582* (2013.01); *H02P 27/08* (2013.01); *B60L 2210/12* (2013.01)

(56) References Cited

FOREIGN PATENT DOCUMENTS

| | | |
|---|---|---|
| CN | 207853783 U | 9/2018 |
| CN | 208401757 U | 1/2019 |
| CN | 109696903 A | 4/2019 |
| CN | 110266245 A | 9/2019 |
| CN | 111786598 A | 10/2020 |
| CN | 211892861 U | 11/2020 |
| EP | 2942866 A1 | 11/2015 |
| JP | H06232719 A | 8/1994 |
| KR | 20170013318 A * | 2/2017 |

OTHER PUBLICATIONS

Li, "Review on Electric Vehicle Safety Issues Considering International Regulations," China Academic Journal Electronic Publishing House, Total 8 pages (Jun. 2020). With an English abstract.

Zhaosong, "Energy Saving and New Energy Bus 500 Questions," Tianjin Science and Technology Press, Total 5 pages (May 2013). With an English abstract.

\* cited by examiner

MOTOR CONTROL SYSTEM AND VEHICLE

CROSS-REFERENCE TO RELATED APPLICATIONS

This application claims priority to Chinese Patent Application No. 202110051283.2, filed on Jan. 14, 2021, which is hereby incorporated by reference in its entirety.

TECHNICAL FIELD

Embodiments of this application relate to the field of motor control, and in particular, to a motor control system and a vehicle.

BACKGROUND

Pure electric vehicles or hybrid electric vehicles have an increasing market share. When synchronous motors are used as power drive for the pure electric vehicles or the hybrid electric vehicles, if a motor control system is faulty, a three-phase active short circuit on a motor usually needs to be performed by a gate drive unit, to avoid unexpected braking torque and damage caused by motor energy backflow to a related component.

However, in a related technology, the gate drive unit is powered by a single-point power source. In this case, if the single-point power source fails, the gate drive unit cannot perform the three-phase active short circuit on the motor.

SUMMARY

This application provides a motor control system and a vehicle, to reliably perform a three-phase active short circuit on a motor when a single-point power source fails.

This application provides a motor control system, including a bus capacitor and a motor. The motor is connected to a positive direct current bus and a negative direct current bus through three phases (U, V, and W) of inverter bridges, the positive direct current bus and the negative direct current bus are respectively connected to a positive terminal and a negative terminal of the bus capacitor, and each phase of inverter bridge includes an upper bridge arm connected to the positive direct current bus and a lower bridge arm connected to the negative direct current bus.

The motor control system further includes: an upper gate drive circuit, a lower gate drive circuit, a first power supply unit, and a second power supply unit. The first power supply unit is connected to three upper bridge arms (that is, three upper bridges) in three phases of inverter bridges through the upper gate drive circuit. The second power supply unit is connected to three lower bridge arms (that is, three lower bridges) in the three phases of inverter bridges through the lower gate drive circuit.

In the motor control system provided in this application, the three upper bridge arms and the three lower bridge arms in the three phases of inverter bridges are respectively provided with independent gate drive circuits and power supply units. In this way, costs of the entire control system can be reduced while a simple architecture of the control system is ensured. Furthermore, another set of power supply unit and gate drive circuit can still ensure reliable execution of a three-phase active short circuit on the motor even if a single power supply unit is faulty (namely, a power source single point fault), so that a function safety requirement of the motor control system is met.

In some possible implementations, the first power supply unit includes a first power source conversion unit and a first power source, an input terminal of the first power source conversion unit is connected to the first power source, and an output terminal of the first power source conversion unit is connected to the upper gate drive circuit; and the second power supply unit includes a second power source conversion unit and a second power source, an input terminal of the second power source conversion unit is connected to the second power source, and an output terminal of the second power source conversion unit is connected to the lower gate drive circuit.

In some possible implementations, the first power source uses the bus capacitor, the first power source conversion unit uses a high-voltage bus buck conversion circuit, and the high-voltage bus buck conversion circuit is connected to the bus capacitor through the positive direct current bus and the negative direct current bus; and the second power source is a low-voltage battery power source, and the second power source conversion unit uses a low-voltage battery power source conversion circuit. In this case, power output by the first power source is output to the upper gate drive circuit after being adjusted by the first power source conversion unit, and is supplied to the three upper bridges through the upper gate drive circuit; and power output by the second power source is output to the lower gate drive circuit after being adjusted by the second power source conversion unit, and is supplied to the three lower bridges through the lower gate drive circuit.

In some possible implementations, the first power source is a low-voltage battery power source, and the first power source conversion unit uses a low-voltage battery power source conversion circuit; and the second power source uses the bus capacitor, the second power source conversion unit uses a high-voltage bus buck conversion circuit, and the high-voltage bus buck conversion circuit is connected to the bus capacitor through the positive direct current bus and the negative direct current bus.

In some possible implementations, the high-voltage bus buck conversion circuit includes a first PWM controller and a first multi-winding transformer. The first multi-winding transformer includes a first primary-side winding and three groups of first secondary-side winding units.

The first PWM controller is connected to a gate of a first transistor, an electrode of the first transistor is connected to a dotted terminal of the first primary-side winding, another electrode of the first transistor is connected to a first terminal of a first resistor and is connected to the first PWM controller, a second terminal of the first resistor is connected to the negative terminal of the bus capacitor through the negative direct current bus, and an undotted terminal of the first primary-side winding is connected to the positive terminal of the bus capacitor through the positive direct current bus.

The first secondary-side winding unit includes: a first secondary-side winding, a second secondary-side winding, a first capacitor, a second capacitor, a first diode, and a second diode. An undotted terminal of the first secondary-side winding is connected to a dotted terminal of the second secondary-side winding, a dotted terminal of the first secondary-side winding is connected to an anode of the first diode, an undotted terminal of the second secondary-side winding is connected to a cathode of the second diode, two terminals of the first capacitor are connected between a cathode of the first diode and the undotted terminal of the first secondary-side winding, and two terminals of the second capacitor are connected between an anode of the second diode and the dotted terminal of the second secondary-side winding.

Output networks of the three groups of first secondary-side winding units are connected to the upper gate drive circuit or the lower gate drive circuit, to supply power to the three upper bridges or the three lower bridges in the three phases (U, V, and W) of inverter bridges.

In some possible implementations, the first multi-winding transformer further includes: a third secondary-side winding, a third diode, and a third capacitor. A dotted terminal of the third secondary-side winding is connected to an anode of the third diode, an undotted terminal of the third secondary-side winding is connected to a ground terminal, and two terminals of the third capacitor are connected between a cathode of the third diode and the undotted terminal of the third secondary-side winding. Two output networks of a secondary-side winding supply power to an isolated drive circuit in the upper gate drive circuit or the lower gate drive circuit, to output a control signal to the three phases of inverter bridges through the isolated drive circuit.

In some possible implementations, the low-voltage battery power source conversion circuit includes a second PWM controller and a second multi-winding transformer. The second multi-winding transformer includes a second primary-side winding and three groups of second secondary-side winding units.

The second secondary-side winding unit includes: a fourth secondary-side winding, a fifth secondary-side winding, a fourth diode, a fifth diode, a fourth capacitor, and a fifth capacitor; an undotted terminal of the fourth secondary-side winding is connected to a dotted terminal of the fifth secondary-side winding and is connected to the ground terminal; a dotted terminal of the fourth secondary-side winding is connected to an anode of the fourth diode; an undotted terminal of the fifth secondary-side winding is connected to a cathode of the fifth diode; two terminals of the fourth capacitor are connected between a cathode of the fourth diode and the undotted terminal of the fourth secondary-side winding; and two terminals of the fifth capacitor are connected between the dotted terminal of the fifth secondary-side winding and an anode of the fifth diode.

Output networks of the three groups of second secondary-side winding units are connected to the lower gate drive circuit or the upper gate drive circuit, to supply power to the three lower bridges or the three upper bridges in the three phases (U, V, and W) of inverter bridges.

The second PWM controller is connected to a gate of a second transistor, an electrode of the second transistor is connected to a dotted terminal of the second primary-side winding, another electrode of the second transistor is connected to a first terminal of a second resistor and is connected to the second PWM controller, a second terminal of the second resistor is connected to a negative terminal of the low-voltage battery power source, an undotted terminal of the second primary-side winding is connected to a cathode of a sixth diode, an anode of the sixth diode is connected to a positive terminal of the low-voltage battery power source, and two terminals of the sixth capacitor are connected between the cathode of the sixth diode and the negative terminal of the low-voltage battery power source.

The second multi-winding transformer further includes: a sixth secondary-side winding, a seventh diode, and a seventh capacitor, where a dotted terminal of the sixth secondary-side winding is connected to an anode of the seventh diode, a cathode of the seventh diode is connected to the second PWM controller, two terminals of the seventh capacitor are connected between the cathode of the seventh diode and an undotted terminal of the sixth secondary-side winding, and the undotted terminal of the sixth secondary-side winding is connected to the ground terminal.

In some possible implementations, each phase of inverter bridge in the three phases of inverter bridges includes two transistors disposed in serial between the positive direct current bus and the negative direct current bus.

In some possible implementations, the transistors may be insulated gate bipolar transistors.

In some possible implementations, the transistors may be metal oxide semiconductor field effect transistors.

An embodiment of this application further provides a vehicle, including the motor control system provided in any one of the foregoing implementations.

DESCRIPTION OF EMBODIMENTS

To make the objectives, technical solutions, and advantages of this application clearer, the following clearly describes the technical solutions in this application with reference to the accompanying drawings in this application. It is clear that the described embodiments are merely a part rather than all of the embodiments of this application. All other embodiments obtained by a person of ordinary skill in the art based on the embodiments of this application without creative efforts shall fall within the protection scope of this application.

In the embodiments, claims, and the accompanying drawings of the specification in this application, terms such as "first" and "second" are merely used for distinction and description, and should not be understood as an indication or implication of relative importance, or as an indication or implication of an order. "Installation", "connection", "being connected to", and the like should be understood in a broad sense, for example, may be a fixed connection, a detachable connection, or an integral connection; or may be a direct connection, an indirect connection through an intermediate medium, or internal communication between two elements. In addition, terms "including" and "having" and any other variants are intended to cover non-exclusive inclusion, for example, include a series of steps or units. A method, system, product, or device is not necessarily limited to those steps or units that are expressly listed, but may include other steps or units that are not expressly listed or inherent to such a process, method, product, or device. "On", "below", and the like are used only relative to the orientation of the components in the accompanying drawings. These directional terms are relative concepts, are used for relative descriptions and clarifications, and may change accordingly as positions at which the components in the accompanying drawings are placed change.

The embodiments of this application provide a vehicle. The vehicle may be a pure electric vehicle or a hybrid electric vehicle. This is not limited in this application.

The vehicle provided in the embodiments of this application is provided with a motor control system. The motor control system uses a redundant backup power source arrangement manner with a simple architecture and low costs, so that when the motor control system is faulty, a three-phase active short circuit on a motor can still be performed even if a single-point power source fails, to avoid problems such as unexpected braking torque generated by the motor and damage caused by motor energy backflow to a related component.

The motor control system provided in the embodiments of this application is further described below.

Figure 1:
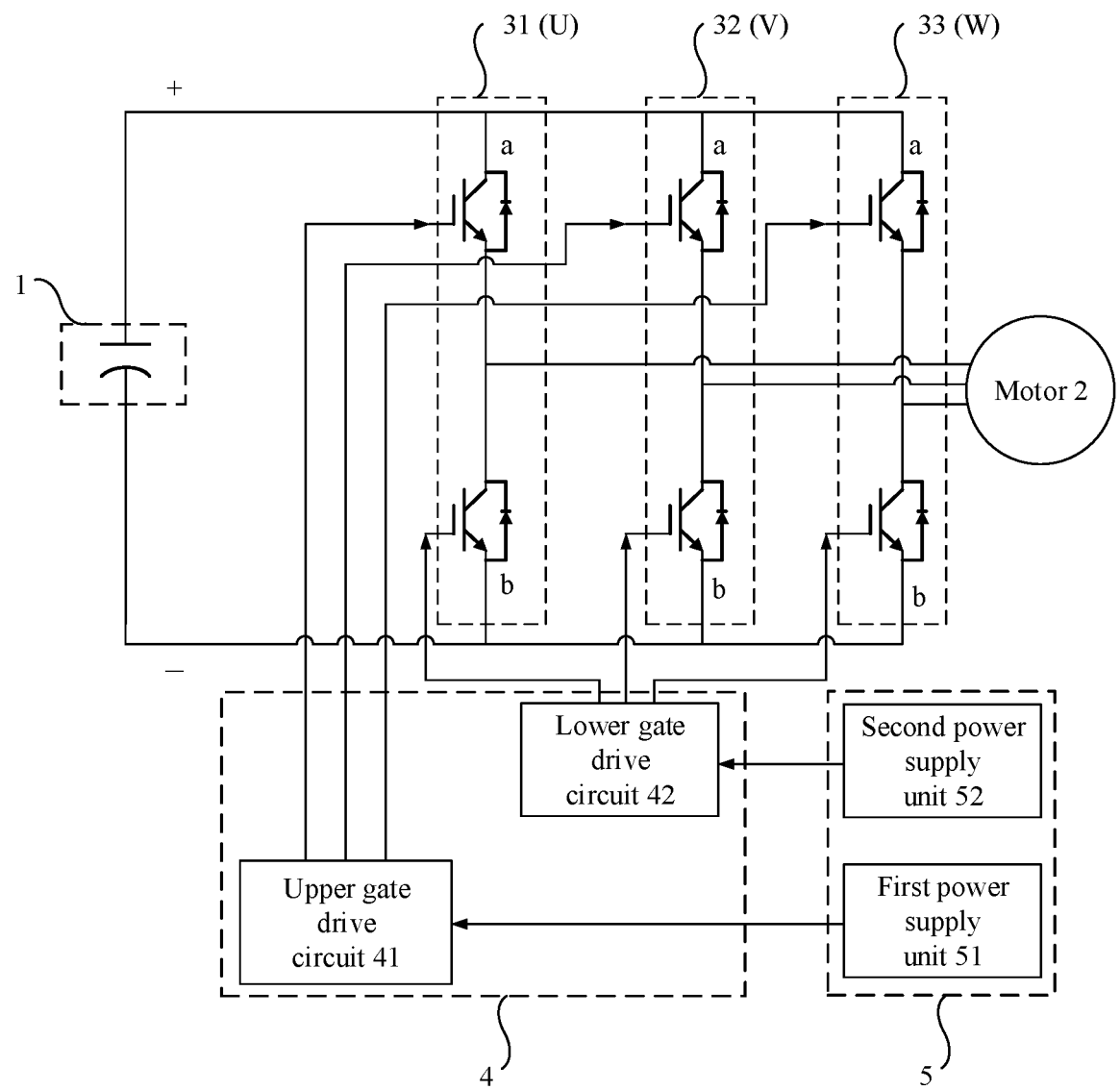
FIG. 1 is a schematic diagram of a motor control system according to an embodiment of this application.

As shown in FIG. 1, an embodiment of this application provides a motor control system. The motor control system includes: a bus capacitor 1, a motor 2, a control unit 4, and a power supply unit 5.

The motor 2 is connected to a positive direct current bus (+) and a negative direct current bus (−) through three phases (U, V, and W) of inverter bridges (31, 32, and 33). The positive direct current bus (+) and the negative direct current bus (−) are respectively connected to a positive terminal and a negative terminal of the bus capacitor 1. Each phase of inverter bridge includes an upper bridge arm a connected to the positive direct current bus (+) and a lower bridge arm b connected to the negative direct current bus (−).

For example, in some possible implementations, as shown in FIG. 1, each phase of inverter bridge in the three phases (U, V, and W) of inverter bridges (31, 32, and 33) includes two transistors disposed in serial between the positive direct current bus (+) and the negative direct current bus (−). In other words, the upper bridge arm a and the lower bridge arm b in each phase of inverter bridge each include one transistor. The transistor may be an insulated gate bipolar transistor (IGBT) or a metal oxide semiconductor field effect transistor (MOSFET). This is not specifically limited in this application, and may be set as required in practice.

The following embodiments of this application are all described by using an example in which each phase of inverter bridge includes two IGBTs (that is, the upper bridge arm a and the lower bridge arm b each include one IGBT) connected in serial. In this case, it may be understood that in a single-phase inverter bridge, in the upper bridge arm a, a gate (that is, a gate) of the IGBT is used as a control terminal of the upper bridge arm a, and a source (that is, a collector) of the IGBT is connected to the positive direct current bus (+); in the lower bridge arm b, a gate (that is, a gate) of the IGBT is used as a control terminal of the lower bridge arm b, a drain (that is, an emitter) of the IGBT is connected to the negative direct current bus (−); and a drain (that is, an emitter) of the IGBT in the upper bridge arm a and a source (that is, a collector) of the IGBT in the lower bridge arm b are connected to the motor 2.

Based thereupon, as shown in FIG. 1, the control unit 4 includes an upper gate drive circuit 41 and a lower gate drive circuit 42, and the power supply unit 5 includes a first power supply unit 51 and a second power supply unit 52.

The first power supply unit 51 is connected to three upper bridge arms a (which may also be referred to as three upper bridges) in the three phases of inverter bridges through the upper gate drive circuit 41. In this case, the first power supply unit 51 supplies power to the IGBTs in the three upper bridges through the upper gate drive circuit 41, to implement a three-phase active short circuit on the motor 2.

The second power supply unit 52 is connected to three lower bridge arms b (which may also be referred to as three lower bridges) in the three phases of inverter bridges through the lower gate drive circuit 42. In this case, the second power supply unit 52 supplies power to the IGBTs in the three lower bridges through the lower gate drive circuit 42.

In conclusion, in the motor control system provided in the embodiments of this application, the first power supply unit 51 and the second power supply unit 52 are used to supply power to the three upper bridge arms a and the three lower bridge arms b in the three phases of inverter bridges (31, 32, and 33) respectively through the upper gate drive circuit 41 and the lower gate drive circuit 42, so that the three upper bridge arms a in the three phases of inverter bridges (31, 32, and 33) can be controlled by using the upper gate drive circuit 41 to implement the three-phase active short circuit on the motor 2, and the three lower bridge arms b in the three phases of inverter bridges (31, 32, and 33) can be controlled by using the lower gate drive circuit 42 to implement the three-phase active short circuit on the motor 2. In this case, even if one of the first power supply unit 51 and the second power supply unit 52 is faulty, the other power supply unit can still perform the three-phase active short circuit on the motor 2 normally.

That is, in the motor control system provided in this application, the three upper bridge arms and the three lower bridge arms in the three phases of inverter bridges are respectively provided with independent gate drive circuits and power supply units. In this way, costs of the entire control system can be reduced while a simple architecture of the control system is ensured. Furthermore, another set of power supply unit and gate drive circuit can still ensure reliable execution of a three-phase active short circuit on the motor even if a single power supply unit is faulty (namely, a power source single point fault), so that a function safety requirement of the motor control system is met.

The following further describes specific arrangements of the first power supply unit 51 and the second power supply unit 52.

Figure 2:
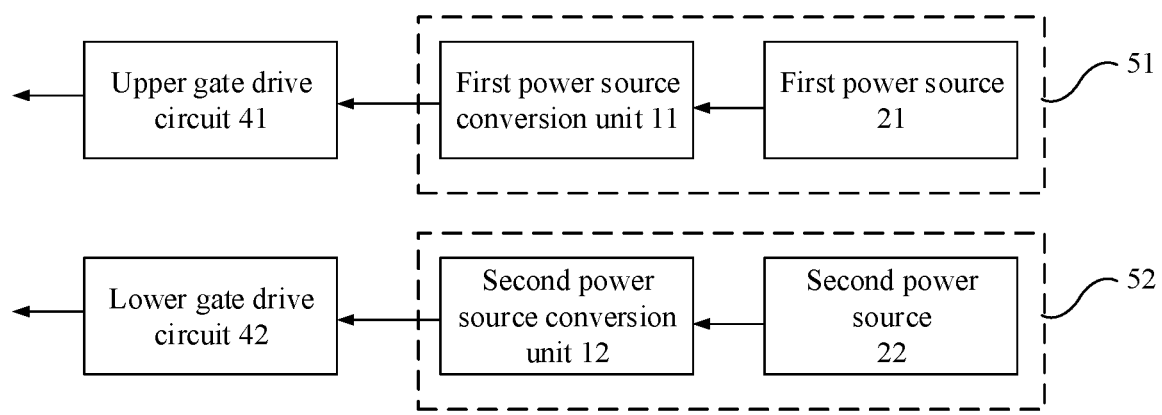
FIG. 2 is a schematic block diagram of a part of structure of a motor control system according to an embodiment of this application.

In some possible implementations, as shown in FIG. 2, the first power supply unit 51 includes a first power source conversion unit 11 and a first power source 21. An input terminal of the first power source conversion unit 11 is connected to the first power source 21, and an output terminal of the first power source conversion unit 11 is connected to the upper gate drive circuit 41. In this case, power output by the first power source 21 is output to the upper gate drive circuit 41 after being adjusted by the first power source conversion unit 11, and is supplied to the IGBTs in the three upper bridges through the upper gate drive circuit 41.

In some possible implementations, as shown in FIG. 2, the second power supply unit 52 includes a second power source conversion unit 12 and a second power source 22. An input terminal of the second power source conversion unit 12 is connected to the second power source 22, and an output terminal of the second power source conversion unit 12 is connected to the lower gate drive circuit 42. In this case, power output by the second power source 22 is output to the lower gate drive circuit 42 after being adjusted by the second power source conversion unit 12, and is supplied to the IGBTs in the three lower bridges through the lower gate drive circuit 42.

Arrangement manners of the first power source conversion unit 11 and the first power source 21 in the first power supply unit 51 and arrangement manners of the second power source conversion unit 12 and the second power source 22 in the second power supply unit 52 are not specifically limited in this application, and may be set as required in practice.

Figure 3:
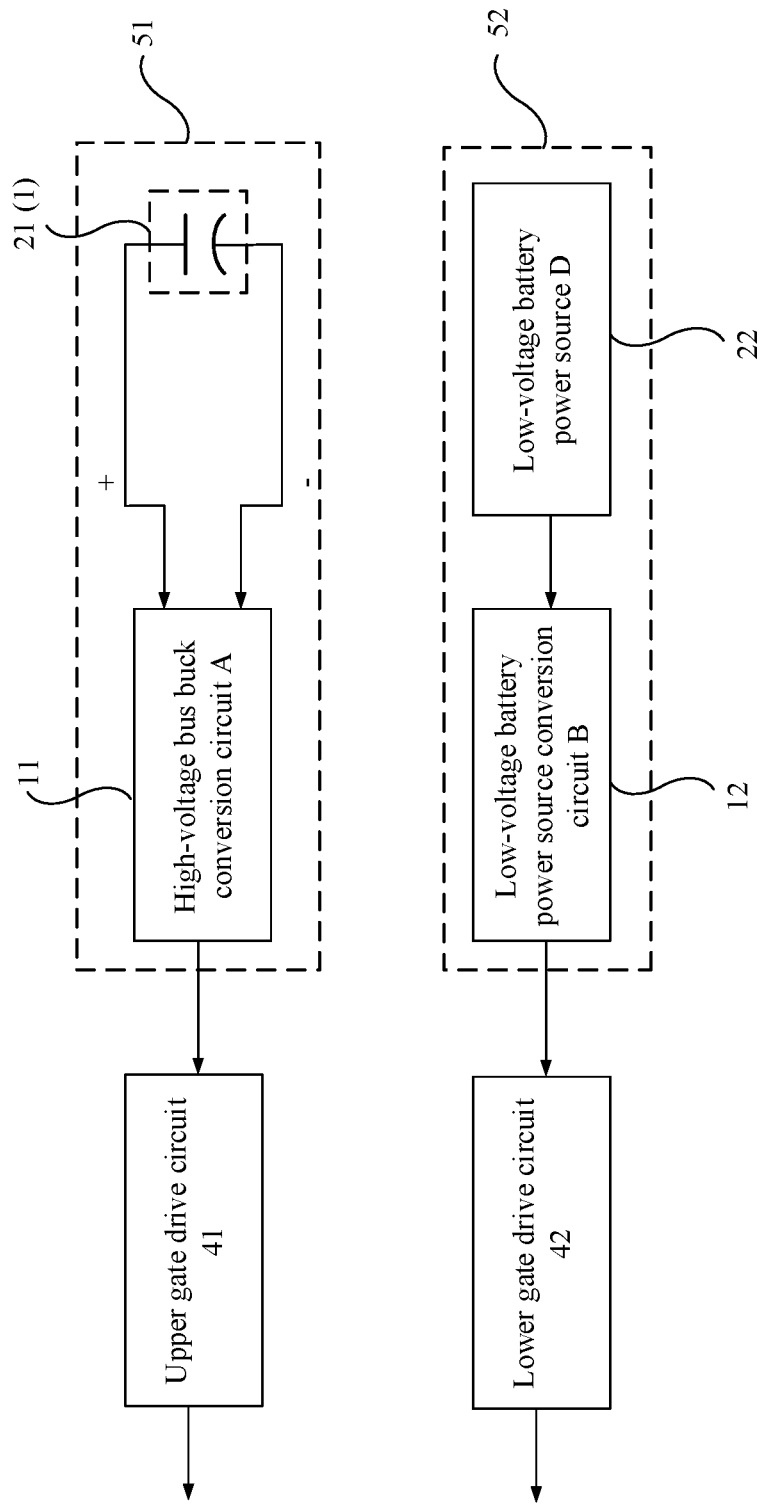
FIG. 3 is a schematic block diagram of a part of structure of a motor control system according to an embodiment of this application.

For example, as shown in FIG. 3, in some possible implementations, in the first power supply unit 51, the first power source 21 may use the bus capacitor 1, and the first power source conversion unit 11 may use a high-voltage bus buck conversion circuit A. In this case, the high-voltage bus buck conversion circuit A is connected to the positive terminal and the negative terminal of the bus capacitor 1 through the positive direct current bus (+) and the negative direct current bus (−). In the second power supply unit 52, the second power source 22 may be a low-voltage battery power source D, for example, may be a 12 V battery power source; and the second power source conversion unit 12 may use a low-voltage battery power source conversion circuit B.

Figure 4:
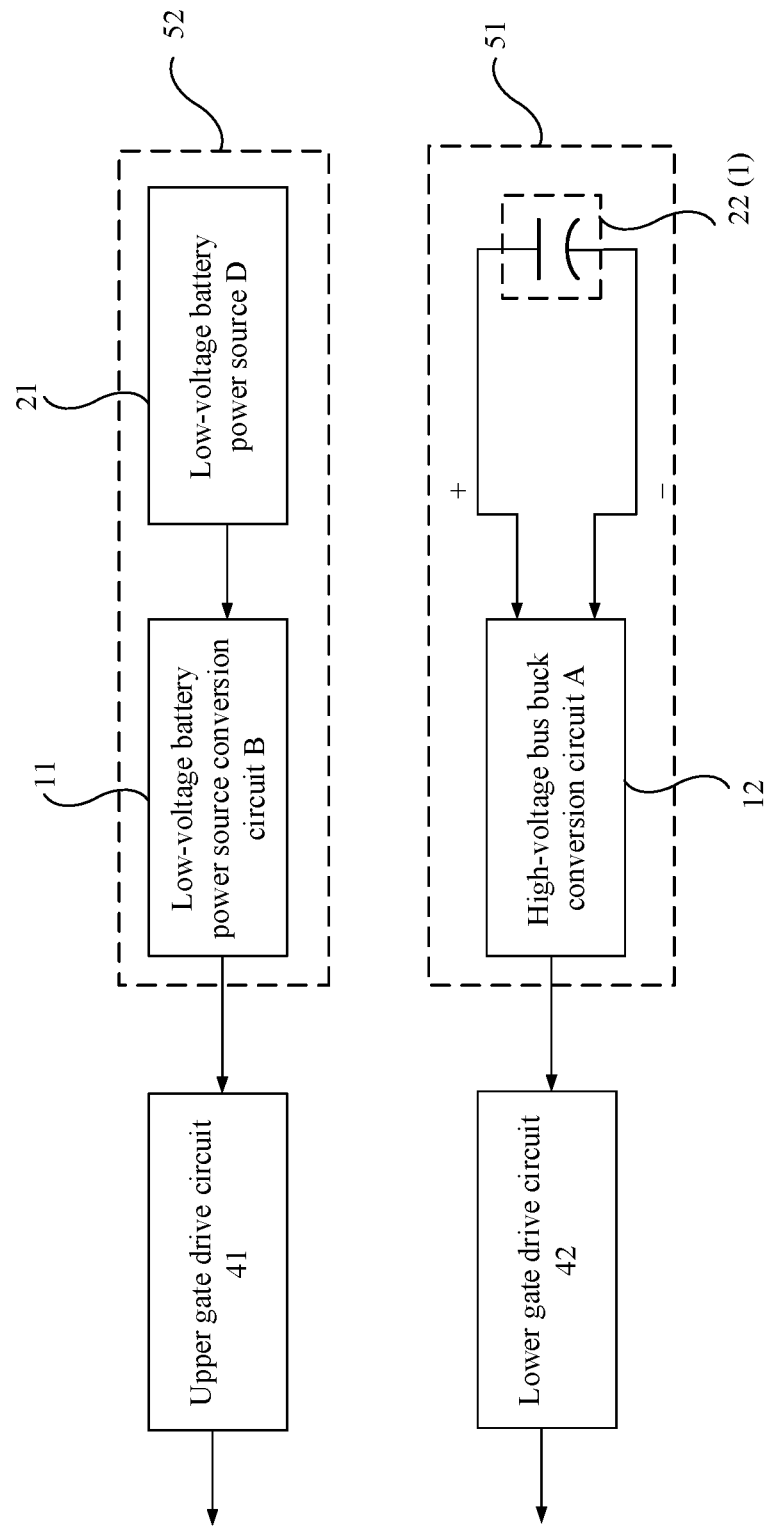
FIG. 4 is a schematic block diagram of a part of structure of a motor control system according to an embodiment of this application.

For another example, as shown in FIG. 4, in some possible implementations, in the first power supply unit 51, the first power source 21 may be a low-voltage battery power source D, for example, may be a 12 V battery power source; and the first power source conversion unit 11 may use a low-voltage battery power source conversion circuit B. In the second power supply unit 52, the second power source 22 may use the bus capacitor 1, and the second power source conversion unit 12 may use a high-voltage bus buck conversion circuit A. In this case, the high-voltage bus buck conversion circuit A is connected to the positive terminal and the negative terminal of the bus capacitor 1 through the positive direct current bus (+) and the negative direct current bus (−).

In the implementations shown in FIG. 3 and FIG. 4, when one of the first power source 21 and the second power source 22 is the low-voltage battery power source D and the other one uses the bus capacitor 1, one of the corresponding first power source conversion unit 11 and second power source conversion unit 12 uses the high-voltage bus buck conversion circuit A and the other one uses the low-voltage battery power source conversion circuit B. Specific arrangement manners of the high-voltage bus buck conversion circuit A and the low-voltage battery power source conversion circuit B are not limited in this application, and may be set as required in practice. For example, the following separately provides specific arrangement structures of the high-voltage bus buck conversion circuit A and the low-voltage battery power source conversion circuit B.

Figure 5:
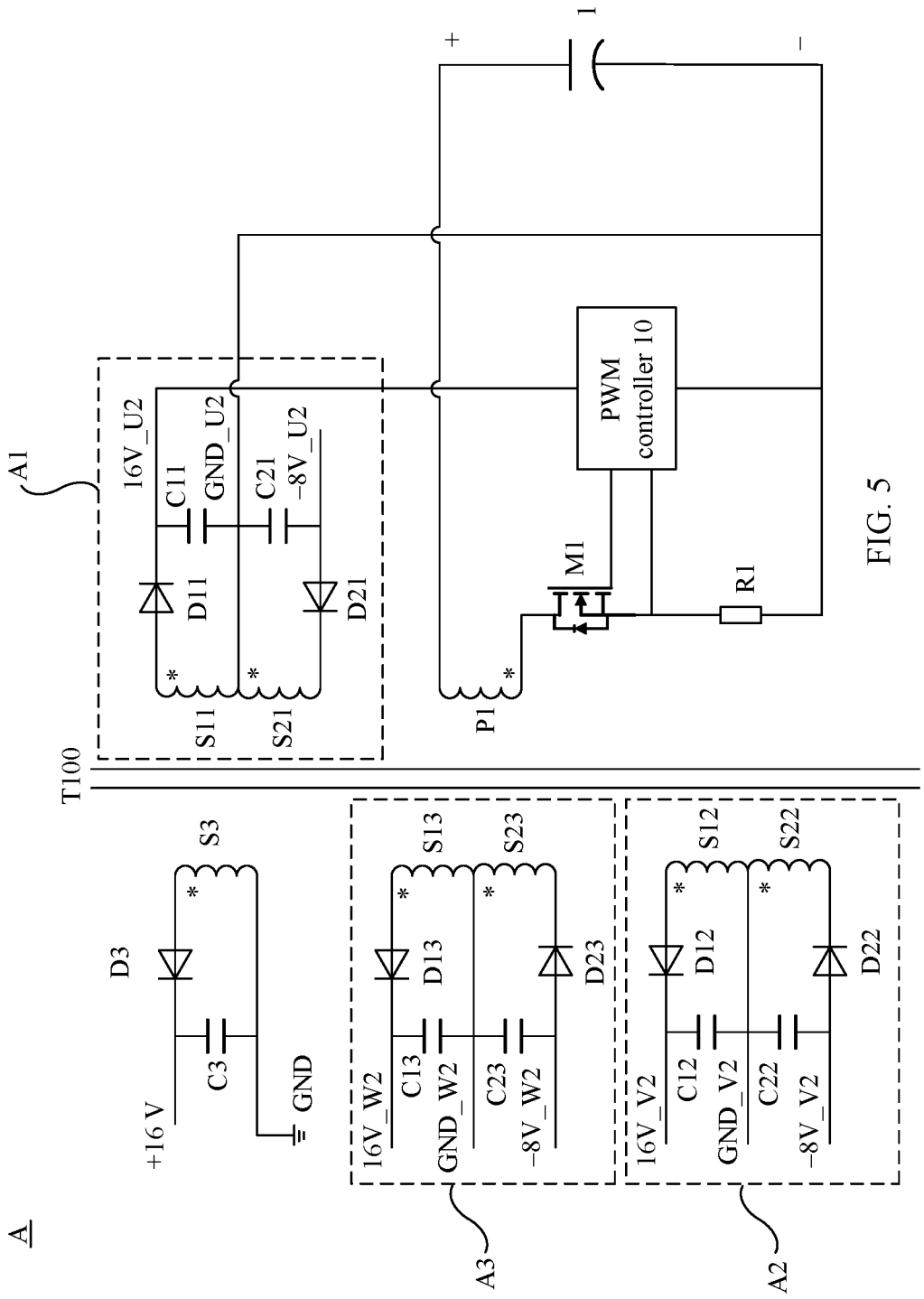
FIG. 5 is a schematic circuit diagram of a high-voltage bus buck conversion circuit in a motor control system according to an embodiment of this application.

For the high-voltage bus buck conversion circuit A, in some possible implementations, as shown in FIG. 5, the high-voltage bus buck conversion circuit A may include a PWM (pulse width modulation) controller 10 (which may also be referred to as a first PWM controller) and a multi-winding transformer T100 (which may also be referred to as a first multi-winding transformer). The multi-winding transformer T100 includes a primary-side winding P1 (which may also be referred to as a first primary-side winding P1) and three groups of secondary-side winding units A1, A2, and A3 (which may also be referred to as three groups of first secondary-side winding units).

As shown in FIG. 5, the PWM controller 10 is connected to a gate of a transistor M1 (which may also be referred to as a first transistor), an electrode (a source or a drain) of the transistor M1 is connected to a dotted terminal (*) of the primary-side winding P1, another electrode (the drain or the source) of the transistor M1 is connected to a first terminal of a resistor R1 (which may also be referred to as a first resistor) and is connected to the PWM controller 10, a second terminal of the resistor R1 is connected to the negative terminal of the bus capacitor 1 through the negative direct current bus (−), and an undotted terminal of the primary-side winding P1 is connected to the positive terminal of the bus capacitor 1 through the positive direct current bus (+).

As shown in FIG. 5, the secondary-side winding unit A1 includes: a secondary-side winding S11, a secondary-side winding S21, a capacitor C11, a capacitor C21, a diode D11, and a diode D21. An undotted terminal of the secondary-side winding S11 is connected to a dotted terminal (*) of the secondary-side winding S21 and is connected to the negative terminal of the bus capacitor 1 through the negative direct current bus (−). A dotted terminal (*) of the secondary-side winding S11 is connected to an anode of the diode D11. An undotted terminal of the secondary-side winding S21 is connected to a cathode of the diode D21. Two terminals of the capacitor C11 are connected between a cathode of the diode D11 and the undotted terminal of the secondary-side winding S11. Two terminals of the capacitor C21 are connected between an anode of the diode D21 and the dotted terminal (*) of the secondary-side winding S21. The cathode of the diode D11 is connected to the PWM controller 10.

In addition, three output networks (such as 16V_U2, GND_U2, and −8V_U2) of the secondary-side winding unit A1 are connected to the upper gate drive circuit 41, and supply power to an IGBT of an upper bridge in one phase of inverter bridge (U) in the three phases of inverter bridges. Alternatively, three output networks (such as 16V_U2, GND_U2, and −8V_U2) of the secondary-side winding unit A1 are connected to the lower gate drive circuit 42, and supply power to an IGBT of a lower bridge in one phase of inverter bridge (U) in the three phases of inverter bridges.

As shown in FIG. 5, the secondary-side winding unit A2 includes: a secondary-side winding S12, a secondary-side winding S22, a capacitor C12, a capacitor C22, a diode D12, and a diode D22. An undotted terminal of the secondary-side winding S12 is connected to a dotted terminal (*) of the secondary-side winding S22. A dotted terminal (*) of the secondary-side winding S12 is connected to an anode of the diode D12. An undotted terminal of the secondary-side winding S22 is connected to a cathode of the diode D22. Two terminals of the capacitor C12 are connected between a cathode of the diode D12 and the undotted terminal of the secondary-side winding S12. Two terminals of the capacitor C22 are connected between an anode of the diode D22 and the dotted terminal (*) of the secondary-side winding S22.

In addition, three output networks (such as 16V_V2, GND_V2, and −8V_V2) of the secondary-side winding unit A2 are connected to the upper gate drive circuit 41, and supply power to an IGBT of an upper bridge in one phase of inverter bridge (V) in the three phases of inverter bridges. Alternatively, three output networks (such as 16V_V2, GND_V2, and −8V_V2) of the secondary-side winding unit A2 are connected to the lower gate drive circuit 42, and supply power to an IGBT of a lower bridge in one phase of inverter bridge (V) in the three phases of inverter bridges.

As shown in FIG. 5, the secondary-side winding unit A3 includes: a secondary-side winding S13, a secondary-side winding S23, a capacitor C13, a capacitor C23, a diode D13, and a diode D23. An undotted terminal of the secondary-side winding S13 is connected to a dotted terminal (*) of the secondary-side winding S23. A dotted terminal (*) of the secondary-side winding S13 is connected to an anode of the diode D13. An undotted terminal of the secondary-side winding S23 is connected to a cathode of the diode D23. Two terminals of the capacitor C13 are connected between a cathode of the diode D13 and the undotted terminal of the secondary-side winding S13. Two terminals of the capacitor C23 are connected between an anode of the diode D23 and the dotted terminal (*) of the secondary-side winding S23.

In addition, three output networks (such as 16V_W2, GND_W2, and −8V_W2) of the secondary-side winding unit A3 are connected to the upper gate drive circuit 41, and supply power to an IGBT of an upper bridge in one phase of inverter bridge (W) in the three phases of inverter bridges. Alternatively, three output networks (such as 16V_W2, GND_W2, and −8V_W2) of the secondary-side winding unit A3 are connected to the lower gate drive circuit 42, and supply power to an IGBT of a lower bridge in one phase of inverter bridge (W) in the three phases of inverter bridges.

Based thereupon, in some possible implementations, the multi-winding transformer T100 in the high-voltage bus buck conversion circuit A may further include: a secondary-side winding S3, a diode D3, and a capacitor C3. A dotted terminal (*) of the secondary-side winding S3 is connected to an anode of the diode D3. An undotted terminal of the secondary-side winding S3 is connected to the ground terminal GND. Two terminals of the capacitor D3 are connected between a cathode of the diode D3 and the undotted terminal of the secondary-side winding S3. Two output networks (such as +16 V and a GND terminal) of the secondary-side winding S3 may be connected to the upper gate drive circuit 41 or the lower gate drive circuit 42 to supply power to the isolated drive circuit in the upper gate drive circuit 41 or the lower gate drive circuit 42, so as to output a control signal to the IGBTs in the three phases of inverter bridges through the isolated drive circuit.

In this case, the PWM controller 10 outputs a PWM signal to the transistor M1 to control on and off of the transistor M1. The resistor R1 feeds back a collected current signal to the PWM controller 10, so that inducting voltages in the secondary-side windings of the three groups of secondary-side winding units A1, A2, and A3 supply power to the IGBTs in the three upper bridges or the three lower bridges through the upper gate drive circuit 41 or the lower gate drive circuit 42 when an electrical signal is provided for the primary-side winding P1 through the bus capacitor 1.

Figure 6:
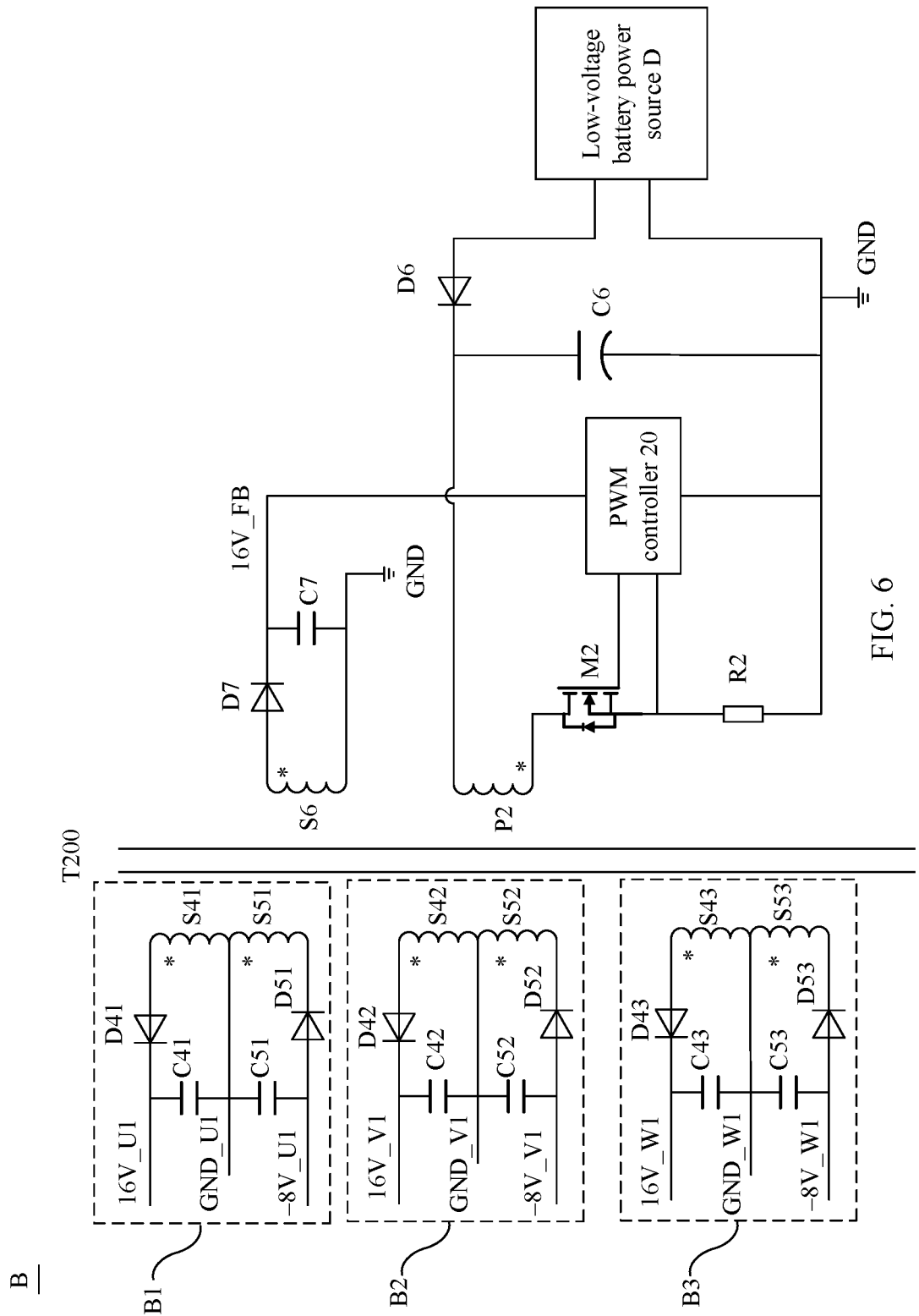
FIG. 6 is a schematic circuit diagram of a low-voltage battery power source conversion circuit in a motor control system according to an embodiment of this application.

For the low-voltage battery power source conversion circuit B,
as shown in FIG. 6, in some possible implementations, the low-voltage battery power source conversion circuit B may include a PWM controller 20 (which may also be referred to as a second PWM controller) and a multi-winding transformer T200 (which may also be referred to as a second multi-winding transformer). The multi-winding transformer T200 includes a primary-side winding P2 (which may also be referred to as a second primary-side winding) and three groups of secondary-side winding units B1, B2, and B3 (which may also be referred to as three groups of second secondary-side winding units).

As shown in FIG. 6, the secondary-side winding unit B1 includes: a secondary-side winding S41, a secondary-side winding S51, a diode D41, a diode D51, a capacitor C41, and a capacitor C51. An undotted terminal of the secondary-side winding S41 is connected to a dotted terminal (*) of the secondary-side winding S51 and is connected to the ground terminal (GND). A dotted terminal (*) of the secondary-side winding S41 is connected to an anode of the diode D41. An undotted terminal of the secondary-side winding SM is connected to a cathode of the diode D51. Two terminals of the capacitor C41 are connected between a cathode of the diode D41 and the undotted terminal of the secondary-side winding S41. Two terminals of the capacitor CM are connected between the dotted terminal (*) of the secondary-side winding SM and an anode of the diode D51.

In addition, three output networks (such as 16V_U1, GND_U1, and −8V_U1) of the secondary-side winding unit B1 are connected to the lower gate drive circuit 42, and supply power to an IGBT of a lower bridge in one phase of inverter bridge (U) in the three phases of inverter bridges. Alternatively, three output networks (such as 16V_U1, GND_U1, and −8V_U1) of the secondary-side winding unit B1 are connected to the upper gate drive circuit 41, and supply power to an IGBT of an upper bridge in one phase of inverter bridge (U) in the three phases of inverter bridges.

As shown in FIG. 6, the secondary-side winding unit B2 includes: a secondary-side winding S42, a secondary-side winding S52, a diode D42, a diode D52, a capacitor C42, and a capacitor C52. An undotted terminal of the secondary-side winding S42 is connected to a dotted terminal (*) of the secondary-side winding S52 and is connected to the ground terminal GND. A dotted terminal (*) of the secondary-side winding S42 is connected to an anode of the diode D42. An undotted terminal of the secondary-side winding S52 is connected to a cathode of the diode D52. Two terminals of the capacitor C42 are connected between a cathode of the diode D42 and the undotted terminal of the secondary-side winding S42. Two terminals of the capacitor C52 are connected between the dotted terminal (*) of the secondary-side winding S52 and an anode of the diode D52.

In addition, three output networks (such as 16V_V1, GND_V1, and −8V_V1) of the secondary-side winding unit B2 are connected to the lower gate drive circuit 42, and supply power to an IGBT of a lower bridge in one phase of inverter bridge (V) in the three phases of inverter bridges. Alternatively, three output networks (such as 16V_V1, GND_V1, and— 8V_V1) of the secondary-side winding unit B2 are connected to the upper gate drive circuit 41, and supply power to an IGBT of an upper bridge in one phase of inverter bridge (V) in the three phases of inverter bridges.

As shown in FIG. 6, the secondary-side winding unit B3 includes: a secondary-side winding S43, a secondary-side winding S53, a diode D43, a diode D53, a capacitor C43, and a capacitor C53. An undotted terminal of the secondary-side winding S43 is connected to a dotted terminal (*) of the secondary-side winding S53 and is connected to the ground terminal GND. A dotted terminal (*) of the secondary-side winding S43 is connected to an anode of the diode D43. An undotted terminal of the secondary-side winding S53 is connected to a cathode of the diode D53. Two terminals of the capacitor C43 are connected between a cathode of the diode D43 and the undotted terminal of the secondary-side winding S43. Two terminals of the capacitor C53 are connected between the dotted terminal (*) of the secondary-side winding S53 and an anode of the diode D53.

In addition, three output networks (such as 16V_W1, GND_W1, and −8V_W1) of the secondary-side winding unit B3 are connected to the lower gate drive circuit 42, and supply power to an IGBT of a lower bridge in one phase of inverter bridge (W) in the three phases of inverter bridges. Alternatively, three output networks (such as 16V_W1, GND_W1, and −8V_W1) of the secondary-side winding unit B3 are connected to the upper gate drive circuit 41, and supply power to an IGBT of an upper bridge in one phase of inverter bridge (W) in the three phases of inverter bridges.

As shown in FIG. 6, the PWM controller 20 is connected to a gate of a transistor M2, an electrode (a source or a drain) of the transistor M2 is connected to a dotted terminal (*) of the primary-side winding P2, another electrode (the drain or the source) of the transistor M2 is connected to a first terminal of a resistor R2 and is connected to the PWM controller 20, a second terminal of the resistor R2 is connected to a negative terminal of the low-voltage battery power source D, an undotted terminal of the primary-side winding P2 is connected to a cathode of a diode D6, an anode of the diode D6 is connected to a positive terminal of the low-voltage battery power source D, and two terminals of a capacitor C6 are connected between the cathode of the diode D6 and the negative terminal of the low-voltage battery power source D. For example, the negative terminal of the low-voltage battery power source D may be connected to the ground terminal (GND).

In this case, the PWM controller 20 outputs a PWM signal to a gate of the transistor M2 to control on and off of the transistor M2. The resistor R2 feeds back a collected current signal to the PWM controller 10, so that inducting voltages in the secondary-side windings of the three groups of secondary-side winding units B1, B2, and B3 supply power to the IGBTs in the three upper bridges or the three lower bridges through the upper gate drive circuit 41 or the lower gate drive circuit 42 when an electrical signal is provided for the primary-side winding P2 through the low-voltage battery power source D.

In addition, in the low-voltage battery power source conversion circuit B, the multi-winding transformer T200 further includes: a secondary-side winding S6, a diode D7, and a capacitor C7. A dotted terminal (*) of the secondary-side winding S6 is connected to an anode of the diode D7. A cathode of the diode D7 is connected to the PWM controller 20. Two terminals of the capacitor C7 are connected between the cathode of the diode D7 and an undotted terminal of the secondary-side winding S6. The undotted terminal of the secondary-side winding S6 is connected to the ground terminal GND. In this case, the secondary-side winding S6 is used as a feedback winding of a transformer to perform a voltage closed-loop feedback function.

It should be noted herein that the foregoing embodiments are merely example descriptions of a process in this application in which the first power supply unit 51 and the second power supply unit 52 supply power to the IGBTs in the three phases of inverter bridges (31, 32, and 33) respectively through the upper gate drive circuit 41 and the lower gate drive circuit 42 to implement the three-phase active short circuit on the motor 2. A person skilled in the art should understand that in the motor control system, in a normal operation process of the motor 2, the first power supply unit 51 and the second power supply unit 52 supply power to the IGBTs in the three phases of inverter bridges (31, 32, and 33) through the upper gate drive circuit 41 and the lower gate drive circuit 42, so that the bus capacitor 1 supplies power to the motor 2 to implement normal operation of the motor 2.

It may be further understood that in the motor control system provided in the embodiments of this application, the bus capacitor 1 can absorb a voltage peak stress of an IGBT in an inverter bridge; and when the motor 2 is operating, the bus capacitor 1 can further reduce a voltage ripple of a direct current bus.

In addition, it should be further noted that the motor control system provided in the foregoing embodiments of this application is not limited to being applied to the vehicle field, and may be applied to any other suitable field, for example, an industrial control field such as servos or frequency converters.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A motor control system, comprising a positive direct current bus, a negative direct current bus, three phases of inverter bridges, a bus capacitor, an upper gate drive circuit, a lower gate drive circuit, a first power supply unit, and a second power supply unit, wherein:
   the three phases of inverter bridges are connected to a motor, the positive direct current bus and the negative direct current bus are respectively connected to a positive terminal and a negative terminal of the bus capacitor, and each phase of inverter bridge comprises an upper bridge arm connected to the positive direct current bus and a lower bridge arm connected to the negative direct current bus;
   the first power supply unit is connected to three upper bridge arms in the three phases of inverter bridges through the upper gate drive circuit, wherein the first power supply unit comprises a first power source conversion unit and a first power source, an input terminal of the first power source conversion unit is connected to the first power source, and an output terminal of the first power source conversion unit is connected to the upper gate drive circuit; and
   the second power supply unit is connected to three lower bridge arms in the three phases of inverter bridges through the lower gate drive circuit, wherein the second power supply unit comprises a second power source conversion unit and a second power source, an input terminal of the second power source conversion unit is connected to the second power source, and an output terminal of the second power source conversion unit is connected to the lower gate drive circuit.

2. The motor control system according to claim 1, wherein:
   the first power source uses the bus capacitor, the first power source conversion unit uses a high-voltage bus buck conversion circuit, and the high-voltage bus buck conversion circuit is connected to the bus capacitor through the positive direct current bus and the negative direct current bus; and
   the second power source is a low-voltage battery power source, and the second power source conversion unit uses a low-voltage battery power source conversion circuit.

3. The motor control system according to claim 1, wherein:
   the first power source is a low-voltage battery power source, and the first power source conversion unit uses a low-voltage battery power source conversion circuit; and
   the second power source uses the bus capacitor, the second power source conversion unit uses a high-voltage bus buck conversion circuit, and the high-voltage bus buck conversion circuit is connected to the bus capacitor through the positive direct current bus and the negative direct current bus.

4. The motor control system according to claim 2, wherein:
the high-voltage bus buck conversion circuit comprises a first pulse width modulation (PWM) controller and a first multi-winding transformer;
the first multi-winding transformer comprises a first primary-side winding and three groups of first secondary-side winding units;
the first PWM controller is connected to a gate of a first transistor, an electrode of the first transistor is connected to a dotted terminal of the first primary-side winding, another electrode of the first transistor is connected to a first terminal of a first resistor and is connected to the first PWM controller, a second terminal of the first resistor is connected to the negative terminal of the bus capacitor through the negative direct current bus, and an undotted terminal of the first primary-side winding is connected to the positive terminal of the bus capacitor through the positive direct current bus;
the first secondary-side winding unit comprises: a first secondary-side winding, a second secondary-side winding, a first capacitor, a second capacitor, a first diode, and a second diode;
an undotted terminal of the first secondary-side winding is connected to a dotted terminal of the second secondary-side winding, a dotted terminal of the first secondary-side winding is connected to an anode of the first diode, an undotted terminal of the second secondary-side winding is connected to a cathode of the second diode, two terminals of the first capacitor are connected between a cathode of the first diode and the undotted terminal of the first secondary-side winding, and two terminals of the second capacitor are connected between an anode of the second diode and the dotted terminal of the second secondary-side winding; and
output networks of the three groups of first secondary-side winding units are connected to the upper gate drive circuit or the lower gate drive circuit.

5. The motor control system according to claim 4, wherein:
the first multi-winding transformer further comprises: a third secondary-side winding, a third diode, and a third capacitor; and
a dotted terminal of the third secondary-side winding is connected to an anode of the third diode, an undotted terminal of the third secondary-side winding is connected to a ground terminal, and two terminals of the third capacitor are connected between a cathode of the third diode and the undotted terminal of the third secondary-side winding.

6. The motor control system according to claim 2, wherein:
the low-voltage battery power source conversion circuit comprises a second pulse width modulation (PWM) controller and a second multi-winding transformer;
the second multi-winding transformer comprises a second primary-side winding and three groups of second secondary-side winding units;
the second secondary-side winding unit comprises: a fourth secondary-side winding, a fifth secondary-side winding, a fourth diode, a fifth diode, a fourth capacitor, and a fifth capacitor; an undotted terminal of the fourth secondary-side winding is connected to a dotted terminal of the fifth secondary-side winding and is connected to the ground terminal; a dotted terminal of the fourth secondary-side winding is connected to an anode of the fourth diode; an undotted terminal of the fifth secondary-side winding is connected to a cathode of the fifth diode; two terminals of the fourth capacitor are connected between a cathode of the fourth diode and the undotted terminal of the fourth secondary-side winding; and two terminals of the fifth capacitor are connected between the dotted terminal of the fifth secondary-side winding and an anode of the fifth diode;
output networks of the three groups of second secondary-side winding units are connected to the lower gate drive circuit or the upper gate drive circuit;
the second PWM controller is connected to a gate of a second transistor, an electrode of the second transistor is connected to a dotted terminal of the second primary-side winding, another electrode of the second transistor is connected to a first terminal of a second resistor and is connected to the second PWM controller, a second terminal of the second resistor is connected to a negative terminal of the low-voltage battery power source, an undotted terminal of the second primary-side winding is connected to a cathode of a sixth diode, an anode of the sixth diode is connected to a positive terminal of the low-voltage battery power source, and two terminals of the sixth capacitor are connected between the cathode of the sixth diode and the negative terminal of the low-voltage battery power source; and
the second multi-winding transformer further comprises: a sixth secondary-side winding, a seventh diode, and a seventh capacitor, wherein a dotted terminal of the sixth secondary-side winding is connected to an anode of the seventh diode, a cathode of the seventh diode is connected to the second PWM controller, two terminals of the seventh capacitor are connected between the cathode of the seventh diode and an undotted terminal of the sixth secondary-side winding, and the undotted terminal of the sixth secondary-side winding is connected to the ground terminal.

7. The motor control system according to claim 1, wherein:
each phase of inverter bridge in the three phases of inverter bridges comprises two transistors disposed in serial between the positive direct current bus and the negative direct current bus.

8. The motor control system according to claim 7, wherein the transistors are insulated gate bipolar transistors.

9. The motor control system according to claim 7, wherein the transistors are metal oxide semiconductor field effect transistors.

10. A vehicle, comprising a motor control system, wherein the motor control system comprises a bus capacitor, a motor, an upper gate drive circuit, a lower gate drive circuit, a first power supply unit, and a second power supply unit, wherein:
the motor is connected to a positive direct current bus and a negative direct current bus through three phases of inverter bridges, the positive direct current bus and the negative direct current bus are respectively connected to a positive terminal and a negative terminal of the bus capacitor, and each phase of inverter bridge comprises an upper bridge arm connected to the positive direct current bus and a lower bridge arm connected to the negative direct current bus;
the first power supply unit is connected to three upper bridge arms in the three phases of inverter bridges through the upper gate drive circuit, wherein the first power supply comprises a first power source conversion unit and a first power source, an input terminal of the first power source conversion unit is connected to the first power source, and an output terminal of the first power source conversion unit is connected to the upper gate drive circuit; and the second power supply unit is connected to three lower bridge arms in the three phases of inverter bridges through the lower gate drive circuit, wherein the second power supply unit comprises a second power source conversion unit and a second power source, an input terminal of the second power source conversion unit is connected to the second power source, and an output terminal of the second power source conversion unit is connected to the lower gate drive circuit.

11. The vehicle according to claim 10, wherein:
the first power source uses the bus capacitor, the first power source conversion unit uses a high-voltage bus buck conversion circuit, and the high-voltage bus buck conversion circuit is connected to the bus capacitor through the positive direct current bus and the negative direct current bus; and
the second power source is a low-voltage battery power source, and the second power source conversion unit uses a low-voltage battery power source conversion circuit.

12. The vehicle according to claim 10, wherein:
the first power source is a low-voltage battery power source, and the first power source conversion unit uses a low-voltage battery power source conversion circuit; and
the second power source uses the bus capacitor, the second power source conversion unit uses a high-voltage bus buck conversion circuit, and the high-voltage bus buck conversion circuit is connected to the bus capacitor through the positive direct current bus and the negative direct current bus.

13. The vehicle according to claim 11, wherein:
the high-voltage bus buck conversion circuit comprises a first pulse width modulation (PWM) controller and a first multi-winding transformer;
the first multi-winding transformer comprises a first primary-side winding and three groups of first secondary-side winding units;
the first PWM controller is connected to a gate of a first transistor, an electrode of the first transistor is connected to a dotted terminal of the first primary-side winding, another electrode of the first transistor is connected to a first terminal of a first resistor and is connected to the first PWM controller, a second terminal of the first resistor is connected to the negative terminal of the bus capacitor through the negative direct current bus, and an undotted terminal of the first primary-side winding is connected to the positive terminal of the bus capacitor through the positive direct current bus;
the first secondary-side winding unit comprises: a first secondary-side winding, a second secondary-side winding, a first capacitor, a second capacitor, a first diode, and a second diode;
an undotted terminal of the first secondary-side winding is connected to a dotted terminal of the second secondary-side winding, a dotted terminal of the first secondary-side winding is connected to an anode of the first diode, an undotted terminal of the second secondary-side winding is connected to a cathode of the second diode, two terminals of the first capacitor are connected between a cathode of the first diode and the undotted terminal of the first secondary-side winding, and two terminals of the second capacitor are connected between an anode of the second diode and the dotted terminal of the second secondary-side winding; and
output networks of the three groups of first secondary-side winding units are connected to the upper gate drive circuit or the lower gate drive circuit.

14. The vehicle according to claim 13, wherein:
the first multi-winding transformer further comprises: a third secondary-side winding, a third diode, and a third capacitor; and
a dotted terminal of the third secondary-side winding is connected to an anode of the third diode, an undotted terminal of the third secondary-side winding is connected to a ground terminal, and two terminals of the third capacitor are connected between a cathode of the third diode and the undotted terminal of the third secondary-side winding.

15. The vehicle according to claim 11, wherein:
the low-voltage battery power source conversion circuit comprises a second pulse width modulation (PWM) controller and a second multi-winding transformer;
the second multi-winding transformer comprises a second primary-side winding and three groups of second secondary-side winding units;
the second secondary-side winding unit comprises: a fourth secondary-side winding, a fifth secondary-side winding, a fourth diode, a fifth diode, a fourth capacitor, and a fifth capacitor; an undotted terminal of the fourth secondary-side winding is connected to a dotted terminal of the fifth secondary-side winding and is connected to the ground terminal; a dotted terminal of the fourth secondary-side winding is connected to an anode of the fourth diode; an undotted terminal of the fifth secondary-side winding is connected to a cathode of the fifth diode; two terminals of the fourth capacitor are connected between a cathode of the fourth diode and the undotted terminal of the fourth secondary-side winding; and two terminals of the fifth capacitor are connected between the dotted terminal of the fifth secondary-side winding and an anode of the fifth diode;
output networks of the three groups of second secondary-side winding units are connected to the lower gate drive circuit or the upper gate drive circuit;
the second PWM controller is connected to a gate of a second transistor, an electrode of the second transistor is connected to a dotted terminal of the second primary-side winding, another electrode of the second transistor is connected to a first terminal of a second resistor and is connected to the second PWM controller, a second terminal of the second resistor is connected to a negative terminal of the low-voltage battery power source, an undotted terminal of the second primary-side winding is connected to a cathode of a sixth diode, an anode of the sixth diode is connected to a positive terminal of the low-voltage battery power source, and two terminals of the sixth capacitor are connected between the cathode of the sixth diode and the negative terminal of the low-voltage battery power source; and
the second multi-winding transformer further comprises: a sixth secondary-side winding, a seventh diode, and a seventh capacitor, wherein a dotted terminal of the sixth secondary-side winding is connected to an anode of the seventh diode, a cathode of the seventh diode is connected to the second PWM controller, two terminals of the seventh capacitor are connected between the cathode of the seventh diode and an undotted terminal of the sixth secondary-side winding, and the undotted terminal of the sixth secondary-side winding is connected to the ground terminal.

16. The vehicle according to claim 10, wherein:
each phase of inverter bridge in the three phases of inverter bridges comprises two transistors disposed in serial between the positive direct current bus and the negative direct current bus.

17. The vehicle according to claim 16, wherein the transistors are insulated gate bipolar transistors.

18. The vehicle according to claim 16, wherein the transistors are metal oxide semiconductor field effect transistors.

* * * * *